(12) United States Patent
Lo et al.

(10) Patent No.: US 7,048,451 B2
(45) Date of Patent: May 23, 2006

(54) OPTICAL TRANSCEIVER AND OPTICAL MODULE USED IN THE SAME

(75) Inventors: Adrian Lo, Tokyo (JP); Makoto Sekijma, Tokyo (JP); Kenjiro Hata, Tokyo (JP); Tohru Kineri, Onoda (JP); Naoki Hanashima, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/885,032

(22) Filed: Jul. 7, 2004

(65) Prior Publication Data
US 2005/0185899 A1 Aug. 25, 2005

(30) Foreign Application Priority Data
Feb. 23, 2004 (JP) ............................. 2004-046528

(51) Int. Cl.
*G02B 6/42* (2006.01)

(52) U.S. Cl. .......................................... 385/92; 385/89

(58) Field of Classification Search ............ 385/88–94, 385/47
See application file for complete search history.

(56) References Cited

U.S. PATENT DOCUMENTS

| | | | |
|---|---|---|---|
| 4,210,704 A * | 7/1980 | Chandross et al. .......... 428/414 |
| 4,444,944 A * | 4/1984 | Matsushita ................... 524/786 |
| 4,595,606 A * | 6/1986 | St. John et al. ............. 427/98.4 |
| 4,904,043 A * | 2/1990 | Schweizer ..................... 398/42 |
| 5,060,114 A * | 10/1991 | Feinberg et al. ............. 361/706 |
| 5,221,339 A * | 6/1993 | Takahashi et al. ..... 106/287.13 |
| 5,487,124 A * | 1/1996 | Bowen et al. ................. 385/93 |
| 5,552,918 A | 9/1996 | Krug et al. .................. 359/152 |
| 5,596,665 A * | 1/1997 | Kurashima et al. ............ 385/92 |
| 5,661,835 A * | 8/1997 | Kato et al. ..................... 385/92 |
| 5,981,641 A * | 11/1999 | Takahashi et al. .......... 524/428 |
| 6,071,016 A * | 6/2000 | Ichino et al. .................. 385/92 |
| 6,282,092 B1 * | 8/2001 | Okamoto et al. ............ 361/704 |
| 6,332,720 B1 | 12/2001 | Shimaoka et al. ............. 385/88 |
| 6,356,686 B1 * | 3/2002 | Kuczynski .................... 385/39 |
| 6,493,121 B1 | 12/2002 | Althaus ....................... 359/152 |
| 6,508,595 B1 * | 1/2003 | Chan et al. .................... 385/92 |
| 6,652,158 B1 * | 11/2003 | Bartur et al. .................. 385/92 |

(Continued)

FOREIGN PATENT DOCUMENTS

EP    0 331 436 A2    2/1989

(Continued)

OTHER PUBLICATIONS

European Search Report for Application No. EP04255838 dated Dec. 3, 2004.

(Continued)

*Primary Examiner*—Sung Pak
*Assistant Examiner*—Mike Stahl
(74) *Attorney, Agent, or Firm*—Wolff Law Offices; Kevin Alan Wolff

(57) ABSTRACT

The optical module includes a main housing to which the optical fiber can be attached and a light-emitting component and a light-receiving component attached to the main housing. At least a part of a surface of the main housing has an irregular pattern to enhance a thermal dissipation. Because at least part of the main housing comprises a heat sink, so the optical module itself has a very high heat dissipation property, eliminating the type of problems that arise when adhesive or the like is used to attach to the main housing heat sinks constituted as separate parts, such as the increase in the number of parts and the degradation in thermal conductivity to the heat sink caused by the adhesive.

24 Claims, 11 Drawing Sheets

U.S. PATENT DOCUMENTS

| | | | |
|---|---|---|---|
| 6,893,167 B1 * | 5/2005 | Brostrom et al. | 385/92 |
| 6,916,122 B1 * | 7/2005 | Branch et al. | 385/92 |
| 6,923,580 B1 * | 8/2005 | Ohno et al. | 385/92 |
| 6,929,406 B1 * | 8/2005 | Amorim | 385/92 |
| 2002/0028049 A1 | 3/2002 | Bartur et al. | 385/92 |
| 2003/0053768 A1 | 3/2003 | Brezina et al. | 385/92 |
| 2003/0141090 A1 | 7/2003 | Kruger et al. | 174/50 |
| 2003/0169983 A1 * | 9/2003 | Branch et al. | 385/92 |

FOREIGN PATENT DOCUMENTS

| | | |
|---|---|---|
| EP | 0 347 120 A2 | 6/1989 |
| EP | 0 542 011 A1 | 10/1992 |
| EP | 0 715 195 A1 | 12/1995 |
| EP | 2003255196 | 2/2002 |
| EP | 0 644 668 B1 | 7/2002 |
| EP | 1 241 502 A2 | 9/2002 |
| EP | 2002296456 | 10/2002 |
| EP | 2003075687 | 3/2003 |
| JP | 61156208 | 7/1986 |
| JP | 3095902 | 8/2003 |
| WO | WO 03/029857 A1 | 4/2003 |

OTHER PUBLICATIONS

European Search Report for Application No. EP04255768 dated Dec. 21, 2004.

European Search Report for Application No. EPP91130 dated May 9, 2005.

* cited by examiner

OPTICAL TRANSCEIVER AND OPTICAL MODULE USED IN THE SAME

TECHNICAL FIELD

The present invention relates to an optical transceiver and to an optical module used in the transceiver. It particularly relates to an optical transceiver that can be used for bi-directional communication system, and to an optical module used in the optical transceiver.

BACKGROUND OF THE INVENTION

In recent years, the development of the Internet has made it possible for people to access large quantities of information in real time and to handle large quantities of information. Information is transmitted by copper wire, optical fiber and wirelessly, but optical fiber is particularly superior for sending large volumes of information at high speeds. In the future, optical fiber is expected to be installed in each home.

However, because at the terminal end information is processed using electric signals, not optical signals, an optical module has to be used between an optical fiber and a terminal in order to connect the optical fiber to the terminal. An optical module is a device that converts optical signals received from the optical fiber to electric signals and supplies the electric signals to the terminal, and converts electric signals from the terminal to optical signals that are supplied to the optical fiber. In the prior art, various types of optical module have been proposed.

Optical output level is an important parameter indicating optical module performance. High-speed data communication systems require high output levels. For example, while a passive optical network (PON) that operates at a transmission speed of 100 MB/sec requires an output level of at least around −10 dBm after a transmission of 20 km, a 1 GB/sec PON system requires an output level of at least around −1 dBm after a transmission of 20 km. Optical output levels can be effectively increased by using light-emitting components that have a high luminous efficiency or by improving a coupling efficiency between the light-emitting component and the optical fiber, but it difficult to obtain a sufficiently high output level by doing just that. In order to transmit data at higher speeds, it is essential to increase the drive current to the light-emitting components.

However, increasing the drive current used to drive light-emitting components also increases the heat that is given off, thus raising the temperature of the light-emitting components themselves. As light-emitting components become high temperature, their emission efficiency usually decreases, so when the component temperature is increased by radiated heat, it becomes necessary to further increase the drive current. In accordance with this vicious cycle, the drive current should be further increased. The reliability of the resulting products is therefore degraded.

Improving the heat dissipation property of the optical transceiver is an effective way of resolving this problem. European Patent Application Laid Open No. 1,241,502 and U.S. Patent Application Laid Open Nos. 2003/0053768 and 2003/0141090, for example, describe optical transceivers with enhanced heat dissipation. In each of these disclosures, the heat dissipation of the optical transceiver is improved by providing the transceiver casing with an irregular pattern.

However, since generally the light-emitting components are not in direct contact with the transceiver casing but are instead spaced apart therefrom, it is difficult for the optical transceivers described in the prior art documents effectively dissipate the heat generated by the light-emitting components. To a certain extent, this problem can be resolved by affixing a heat sink to the main housing of the optical modules. However, doing this increases the number of parts, and another problem is that the adhesive used to attach the heat sink degrades the thermal conductivity to the heat sink, making it impossible to ensure an adequate heat dissipation property.

SUMMARY OF THE INVENTION

It is therefore an object of the present invention to provide an optical module having improved heat dissipation, and an optical transceiver that includes the optical module.

Another object of the present invention is to provide an optical module that enables drive current to light-emitting components to be reduced, thereby improving reliability, and an optical transceiver that includes the optical module.

The above and other objects of the present invention can be accomplished by an optical module to be employed to an optical transceiver, for converting an optical signal received from an optical fiber into an electronic signal and converting the electronic signal into the optical signal to be supplied to the optical fiber, comprising:

a main housing to which the optical fiber can be attached;

a light-emitting component attached to the main housing; and a light-receiving component attached to the main housing, at least a part of a surface of the main housing having an irregular pattern to enhance a thermal dissipation.

According to the present invention, because at least part of the main housing comprises a heat sink, so the optical module itself has a very high heat dissipation property, eliminating the type of problems that arise when adhesive or the like is used to attach to the main housing heat sinks constituted as separate parts, such as the increase in the number of parts and the degradation in thermal conductivity to the heat sink caused by the adhesive.

In a preferred aspect of the present invention, the irregular pattern is formed in a vicinity of the light emitter component. This is because among the components constituting an optical module, the light-emitting component generates the most heat. The irregular pattern can be composed of a plurality of heat-dissipating fins or a plurality of heat-dissipating rods.

In a further preferred aspect of the present invention, the optical module further comprises a sealant to seal a gap between the main housing and the light-emitting component, a main component of the sealant being a resin including an agent to enhance a thermal conductivity. According to this aspect of the present invention, heat generated by the light-emitting component can be efficiently conducted to the main housing. It is preferable that a thermal conductivity of the agent is equal to or more than 200 W/(m·° C.). It is further preferable that the agent is in a form of particles having a diameter that is 0.1 to 20 µm.

Preferably, the agent includes at least one of materials selected from a group of copper (Cu), silver (Ag) aluminum (Al), aluminum nitride (AlN), beryllium oxide (BeO), silicon carbide (SiC), diamond and diamond-like carbon.

In a further preferred aspect of the present invention, the optical module further comprises:

a filter support member having a first surface which has a first angle to an optical path of a light from the light-emitting component and a second surface which has a second surface different from the first angle;

a first optical filter mounted on the first surface of the filter support member; and a second optical filter mounted on the second surface of the filter support member.

According to this aspect of the present invention, because the two optical filters are held by just the one filter support member, it is possible to keep down the number of parts. Moreover, having the two optical filters held by the one filter support member also provides good positioning accuracy, since there is almost no deviation in the positional relationship of the two filters.

In a further preferred aspect of the present invention, the first optical filter can reflect a light supplied from the optical fiber and can transmit a light emitted from the light-emitting component, the second optical filter can transmit a light supplied from the optical fiber and can reflect a light emitted from the light-emitting component. According to this aspect of the present invention, even if light from the light-emitting component should stray and scatter inside the main housing, it does not reach the light-receiving component but is blocked by the second optical filter. This makes it possible to reduce noise caused by stray light.

The above and other objects of the present invention can be also accomplished by an optical transceiver comprising an electronic circuit formed on a circuit board and an optical module for converting an optical signal received from an optical fiber into an electronic signal to be supplied to the electronic circuit and converting the electronic signal received from the electronic circuit into the optical signal to be supplied to the optical fiber, the optical module, comprising:

a main housing to which the optical fiber can be attached;

a light-emitting component attached to the main housing; and a light-receiving component attached to the main housing, at least a part of a surface of the main housing having an irregular pattern to enhance a thermal dissipation.

Thus, at least part of the main housing comprises a heat sink, giving the optical module itself a very high heat dissipation property without increasing the number of parts.

In a preferred aspect of the present invention, the circuit board has a cut portion to prevent the circuit board from covering the irregular pattern of the main housing. According to this aspect of the present invention, because the irregular pattern is exposed rather than being covered by the circuit board, so heat dissipation by the irregular pattern is not obstructed by the circuit board.

In a further preferred aspect of the present invention, the optical transceiver further comprises a transceiver case for supporting the circuit board and the optical module and a silicone gel provided between the transceiver case and the main housing. According to this aspect of the present invention, the heat of the main housing can be efficiently conducted to the transceiver case, further enhancing the heat dissipation property.

In a further preferred aspect of the present invention, the silicone gel includes an agent to enhance a thermal conductivity.

Thus, in accordance with this invention, the optical module itself has a very high heat-dissipation property, effectively holding in check the temperature elevation of the light-emitting component. This enables the drive current to the light-emitting component to be reduced, thereby increasing the reliability of the product.

BRIEF DESCRIPTION OF THE DRAWINGS

The above and other objects, features and advantages of this invention will become more apparent by reference to the following detailed description of the invention taken in conjunction with the accompanying drawings, wherein.

DETAILED DESCRIPTION OF THE EMBODIMENTS

Preferred embodiments of the present invention will now be described with reference to the drawings.

Figure 1:
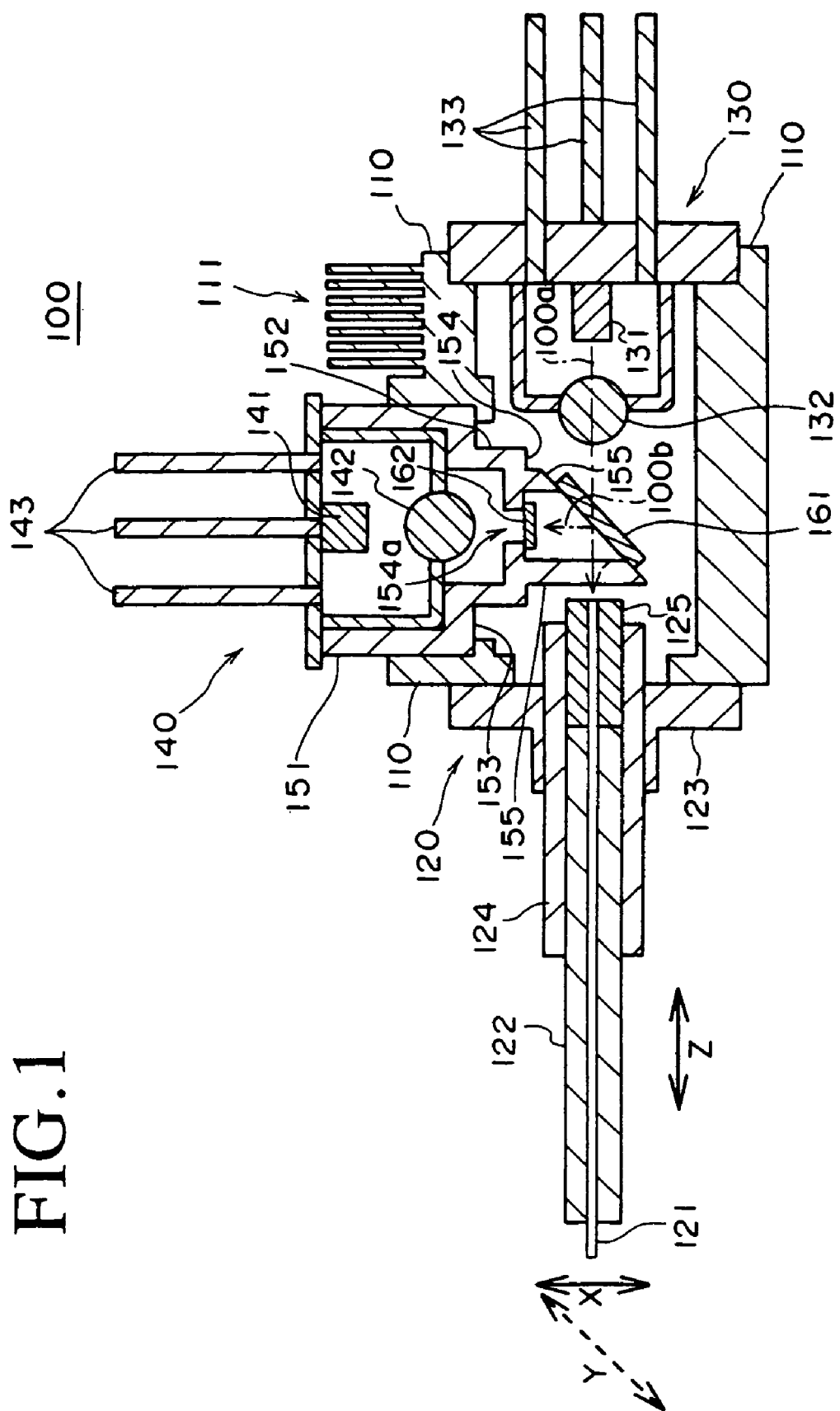
FIG. 1 is a cross-sectional view of the configuration of an optical module according to a preferred embodiment of the present invention.

FIG. 1 is a cross-sectional view of the configuration of an optical module 100 according to a preferred embodiment of the present invention.

As shown in FIG. 1, the optical module 100 according to this embodiment includes a main housing 110, a fiber support component 120 affixed to the main housing 110, a light-emitting component 130, a light-receiving component 140, a filter support member 150 provided so that it covers the light-receiving component 140, and first and second optical filters 161 and 162 that are held by the filter support member 150. The optical module 100 is used to carry out bi-directional communication between terminals using optical signals. The optical module 100 does this by receiving optical signals from an optical fiber 121 that have a wavelength of, for example, about 1500 nm and converting them to electric signals, and converting electric signals from a terminal to optical signals that have a wavelength of, for example, about 1300 nm, and supplying the optical signals to the optical fiber 121.

The main housing 110 is in the form of a cylindrical structure having the fiber support component 120 attached to one end and the light-emitting component 130 attached to the other end. The light-receiving component 140 is affixed at an angle of 90 degrees to a straight line connecting the fiber support component 120 and the light-emitting component 130. In deciding on the material of the main housing 110, it is necessary to take into consideration mechanical strength, machining precision and thermal conductivity. Metal is the optimum material for the main housing 110.

As shown in FIG. 1, a part of the surface of the main housing 110 has an irregular pattern 111 that improve heat dissipation. In other words, a part of the main housing 110 constitutes a heat sink, so the optical module 100 itself has a very high heat dissipation property, eliminating the type of problems that arise when adhesive or the like is used to attach separate heat sink components to the main housing 110, such as the increase in the number of parts and the degradation in thermal conductivity to the heat sink caused by the adhesive.

In this embodiment, the irregular pattern 111 are provided in the vicinity of the light-emitting component 130. This is because of the components constituting the optical module 100, the light-emitting component 130 generates the most heat, and with this arrangement, the heat generated by the light-emitting component 130 is efficiently dissipated to the outside by the irregular pattern 111.

Figure 2:
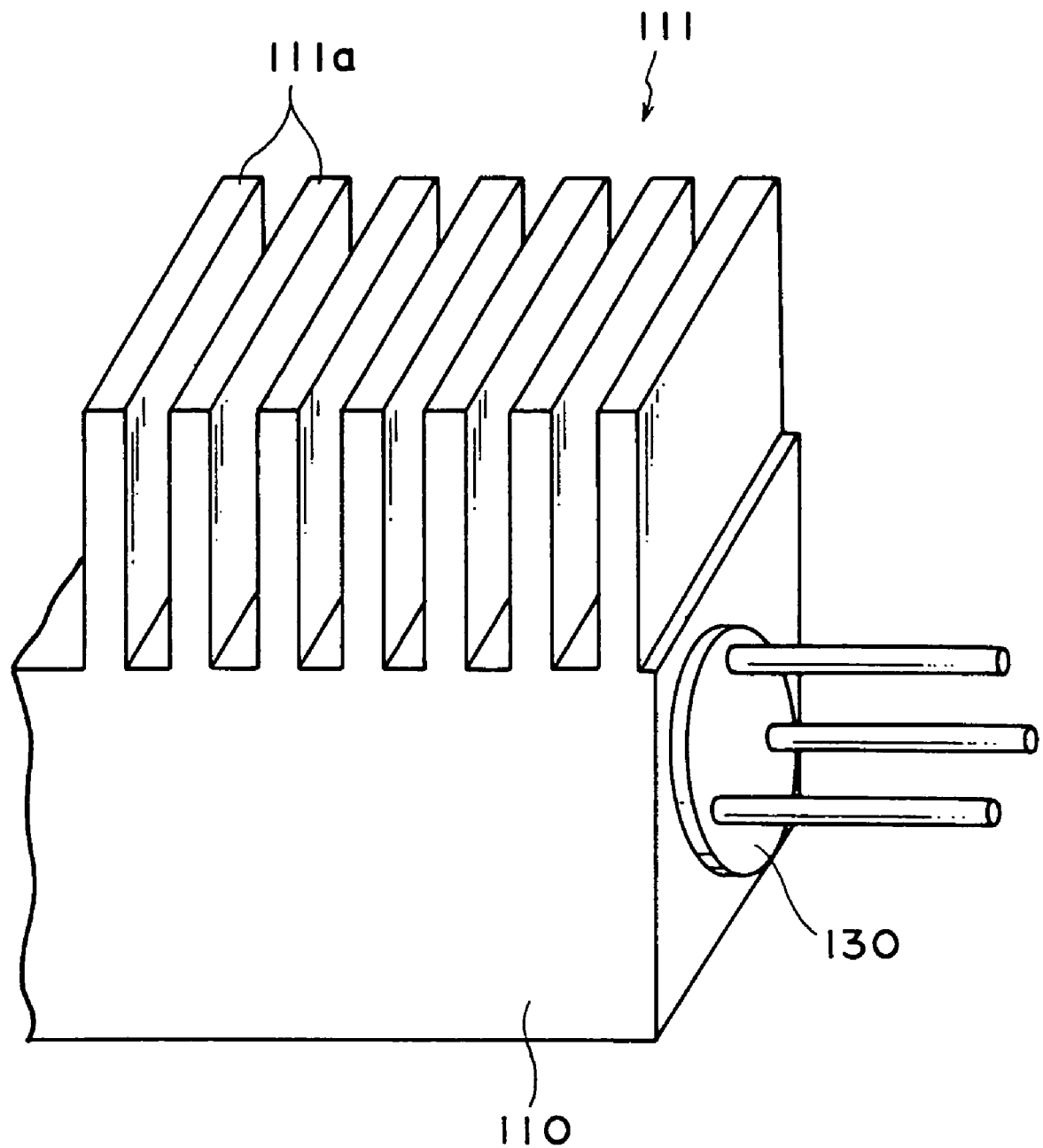
FIG. 2 is an enlarged perspective view of the portion of the main housing having an irregular pattern.

FIG. 2 is an enlarged perspective view of the portion of the main housing 110 forming the irregular pattern 111. As shown in FIG. 2, the irregular pattern 111 comprise a regular array of a plurality of heat-dissipation fins 111a which increase the surface area of the main housing 110.

Figure 3:
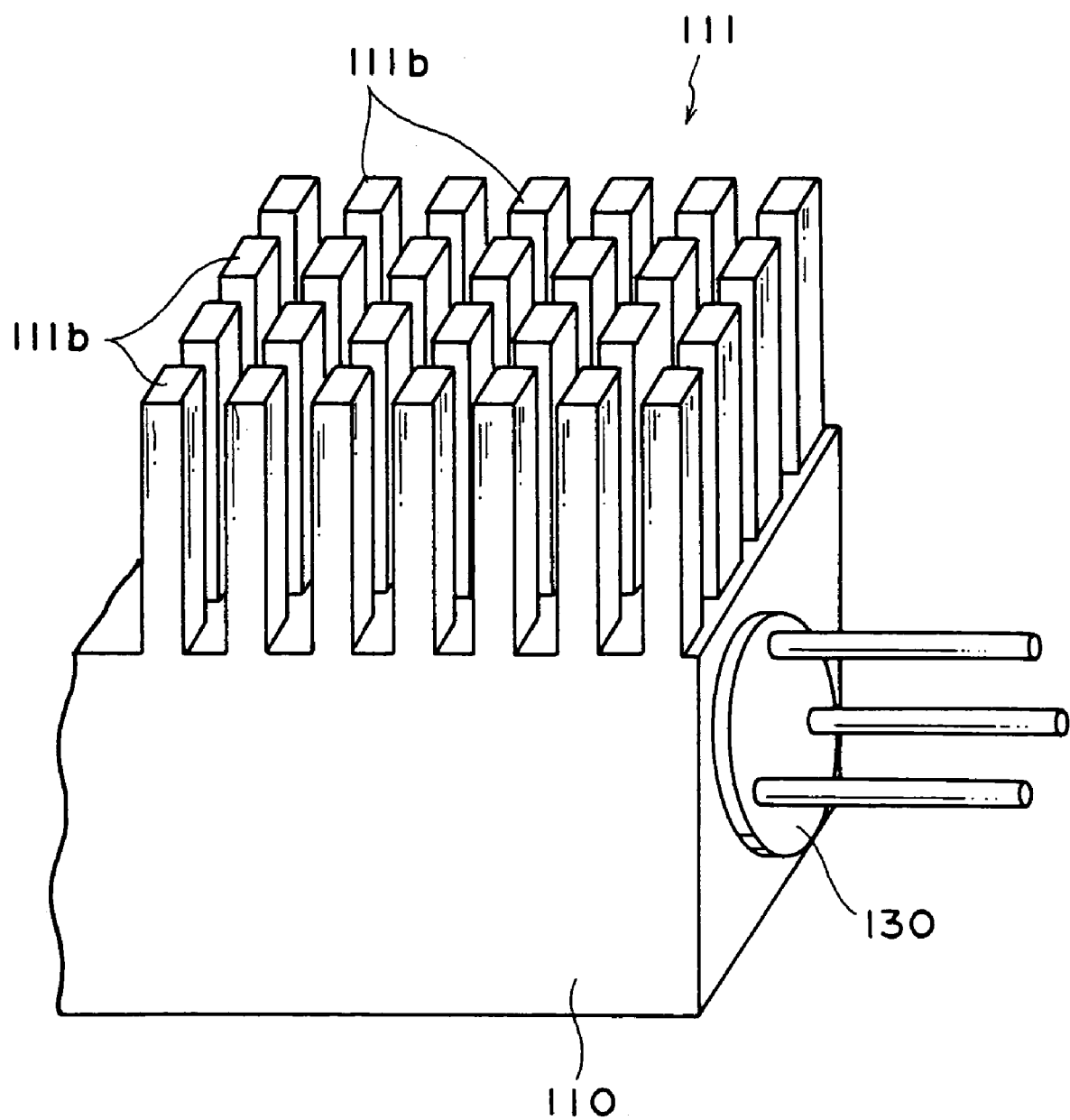
FIG. 3 is a perspective view of an example in which the irregular pattern is formed of square heat-dissipating rods.
Figure 4:
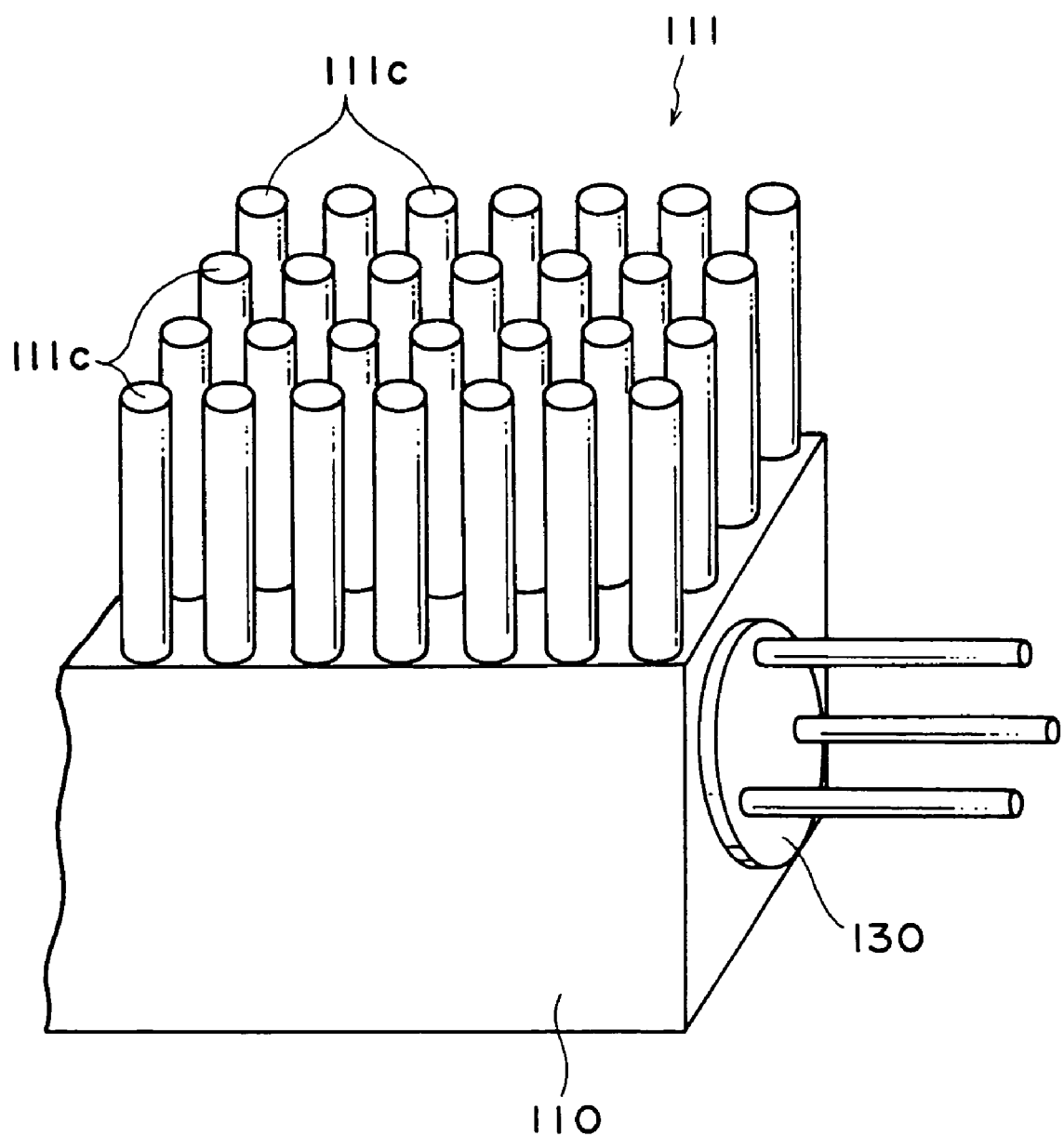
FIG. 4 is a perspective view of another example in which the irregular pattern is formed of round heat-dissipating rods.
Figure 5:
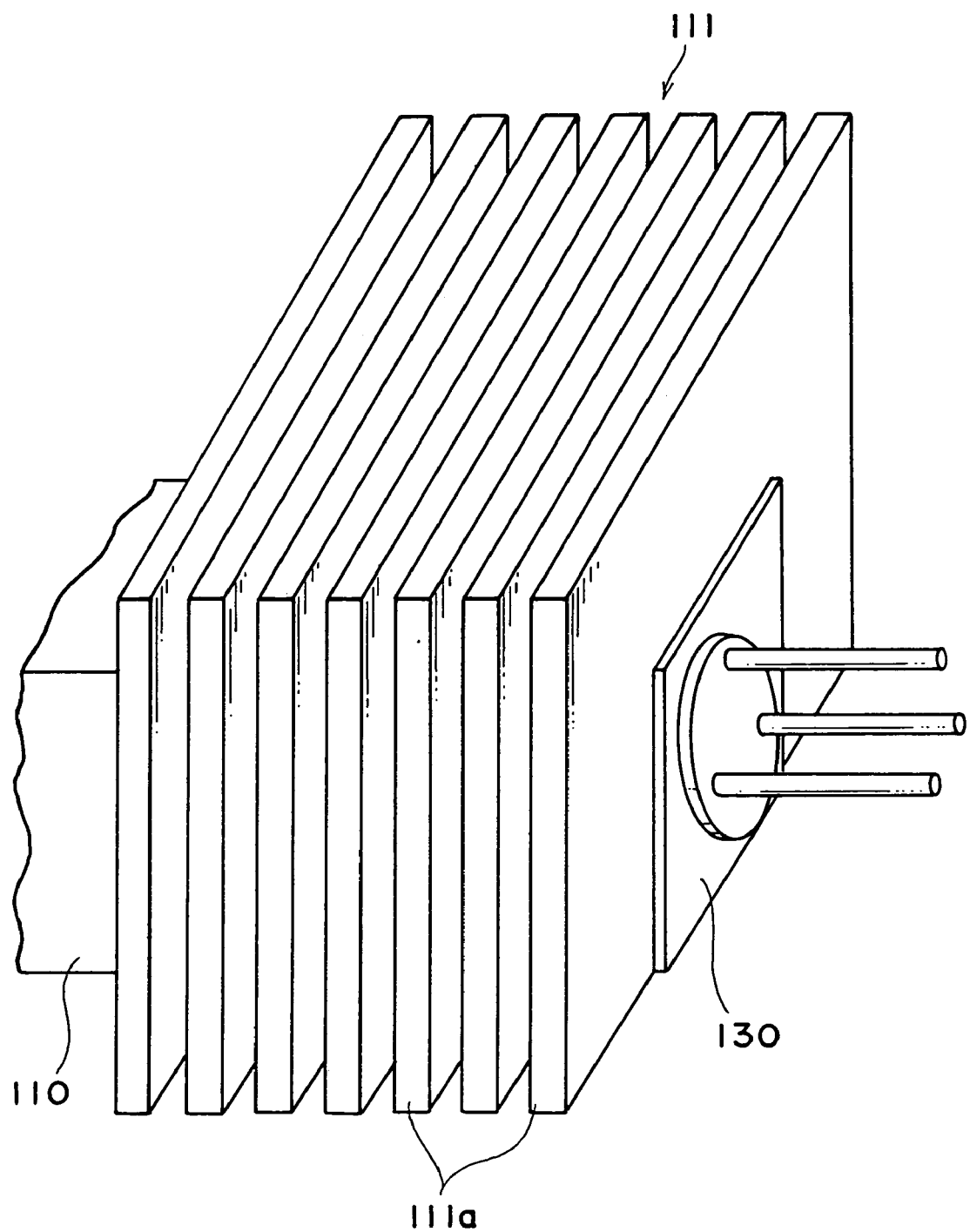
FIG. 5 is a partial perspective view of an example of large heat-dissipating fins.

The shape of the irregular pattern 111 is not limitative. Instead, the irregular pattern 111 can be formed as a regular array of a plurality of square heat-dissipating rods 111b, as shown in FIG. 3, or round heat-dissipating rods 111c, as shown in FIG. 4. It is also not necessary to arrange the heat-dissipating fins 111a or the heat-dissipating rods 111b in a regular array. Any formation may be used that increases the surface area of the main housing 110. Moreover, although in FIGS. 2 to 4 the irregular pattern 111 are shown as being provided on one surface of the main housing 110, this is not limitative. As shown in FIG. 5, for example, the irregular pattern 111 may be provided on two or more surfaces of the main housing 110, as long as it does not interfere with the incorporation to the optical transceiver described below. This does not mean the main housing 110 has to have a square shape; it can instead be round.

The fiber support component 120 is attached in one end of the main housing 110. The fiber support component 120 functions by holding the end of the optical fiber 121 as the optical signal transmission medium, and the optical fiber cover 122. The fiber support component 120 includes a ring-shaped first slider 123, and a cylindrical second slider 124 into which is inserted a ferrule 125 that holds the end portion of the optical fiber 121. With respect to the main housing 110, the first slider 123 can slidably move in the X direction (vertically with respect to FIG. 1) and the Y direction (normal to the page on which FIG. 1 is drawn), which allows the position of the optical fiber 121 to be adjusted perpendicularly to the optical axis. The second slider 124 can slidably move in the Z direction (from side to side with respect to FIG. 1) relative to the first slider 123, which allows the position of the optical fiber 121 to be adjusted along the line of the optical axis. While there is no particular limitation on the material of the first and second sliders 123 and 124, from the standpoint of mechanical strength and machining precision, it is preferable to use metal.

The light-emitting component 130 is attached in the other end the main housing 110. The light-emitting component 130 includes a light-emitting portion 131, a lens 132 that concentrates the transmitting light 100a emitted by the light-emitting portion 131, and signal pins 133 that receive the electric signals from a terminal. The function of the light-emitting component 130 is to use the light-emitting portion 131 to convert an electric signal received from the terminal via the signal pins 133 into an optical signal, and transmit the optical signal to the optical fiber 121, via the lens 132. The lens 132 is not an essential component of the light-emitting component 130, and may therefore be omitted.

Figure 6:
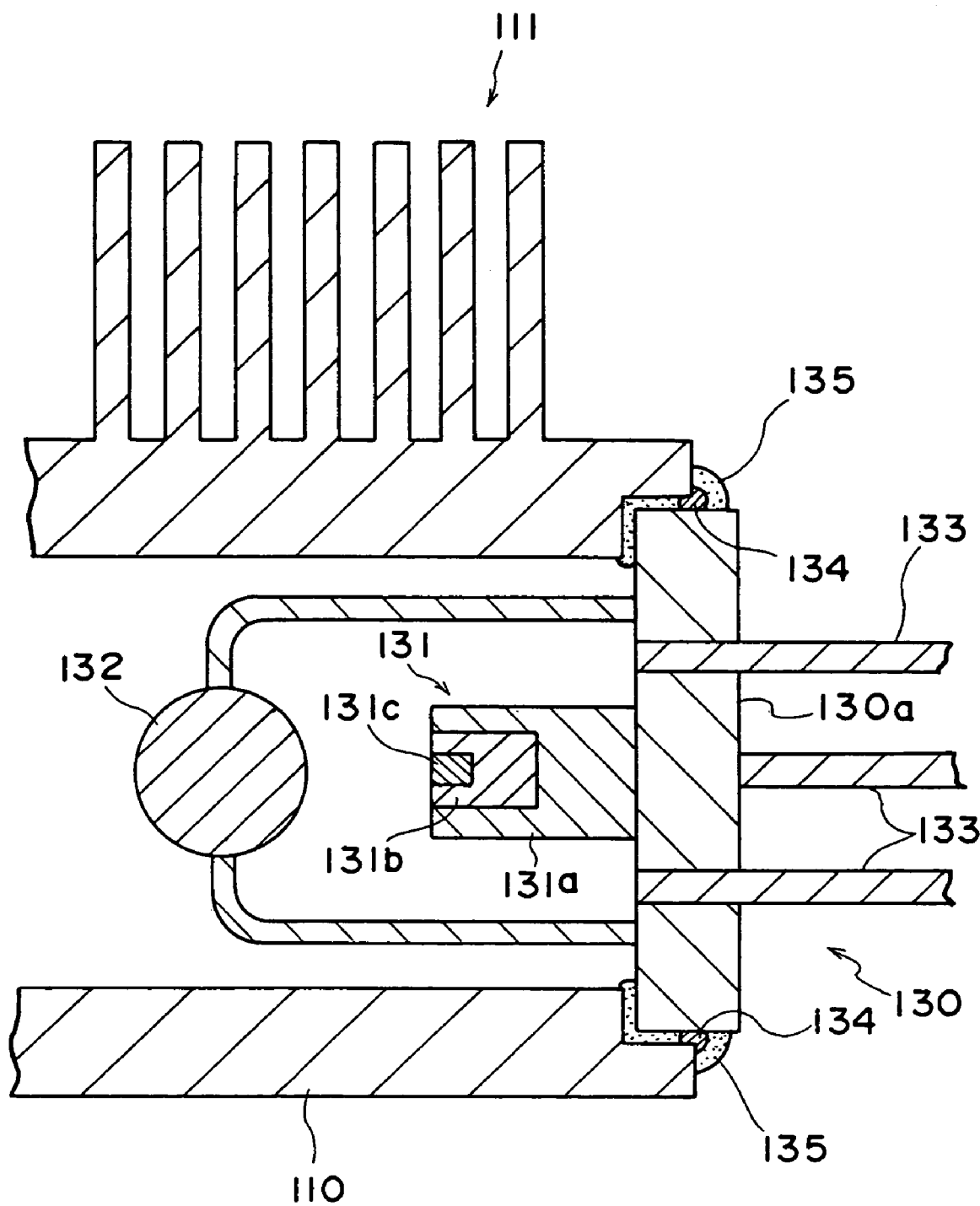
FIG. 6 is an enlarged partial cross-sectional view of the vicinity of the light-emitting component of the optical module shown in FIG. 1.

FIG. 6 is an enlarged partial cross-sectional view of the vicinity of the light-emitting component 130 of the optical module 100.

As shown in FIG. 6, the light-emitting portion 131 of the light-emitting component 130 comprises a platform 131a extending from a stem 130a, a sub-mount 131b mounted on the platform 131a, and a laser diode 131c mounted on the sub-mount 131b. The actual photoelectric conversion is carried out by the laser diode 131c. The platform 131a and the sub-mount 131b are provided to support the laser diode 131c. Heat produced by the laser diode 131c is conducted to the main housing 110 via the sub-mount 131b, platform 131a and stem 130a, and is dissipated to the outside mainly by the irregular pattern 111.

The stem 130a is affixed to the main housing 110 by a welded portion 134. The gap between the main housing 110 and the light-emitting component 130 is sealed with a sealant 135. The welded portion 134 can be formed by laser welding or resistance welding or the like.

Since the gap between the light-emitting component 130 and the main housing 110 is filled with the sealant 135, if the sealant 135 has low thermal conductivity, heat generated by the laser diode 131c will not be efficiently conducted to the main housing 110. Taking this into consideration, in this embodiment, an agent is added to the resin which is the main component of the sealant 135, to increase the thermal conductivity of the sealant. The resin may be epoxy resin or silicone resin or the like. The agent used to increase the thermal conductivity has to have a higher thermal conductivity than that of the resin, and preferably has a thermal conductivity that is higher than the 50 W/(m·° C.) or more of the iron (Fe) which is the preferred material of the main housing 110. More preferably, to achieve the full effect, it should have a thermal conductivity of at least 200 W/(m·° C.). The agent should also be in the form of particles having a diameter that is not less than 0.1 μm and not more than 20 μm. A particulate size in that range enables the agent to be evenly distributed in the resin without any major loss of the close adhesive power of the sealant 135.

Specifically, the agent used to enhance the thermal conductivity should include one or more selected from the group copper (Cu), silver (Ag), aluminum (Al), aluminum nitride (AlN), beryllium oxide (BeO), silicon carbide (SiC), diamond and diamond-like carbon. Copper (Cu) has a thermal conductivity of 400 W/(m·° C.); that of silver (Ag) is 428 W/(m·° C.); that of aluminum (Al) is 237 W/(m·° C.); that of aluminum nitride (AlN) is 285 W/(m·° C.); that of beryllium oxide (BeO) is 330 W/(m·° C.); and that of silicon carbide (SiC) is 400 W/(m·° C.) (values differ depending on the structure); diamond and diamond-like carbon has a thermal conductivity of 620 W/(m·° C.). The particulate matrix of the above agents may be coated with nickel (Ni) or gold (Au).

The light-receiving component 140 includes a light-receiving element 141, such as a photodiode or the like, a lens 142 that concentrates the receiving light 100b from the optical fiber 121 to the light-receiving element 141, and signal pins 143 that supply electric signals to a terminal. The function of the light-receiving component 140 is to use the light-receiving element 141 to convert an optical signal received via the lens 142 into an electric signal, and transmit the electric signal to the terminal, via the signal pins 143.

The lens 142 is not an essential component of the light-emitting component 140, and may therefore be omitted.

Figure 7:
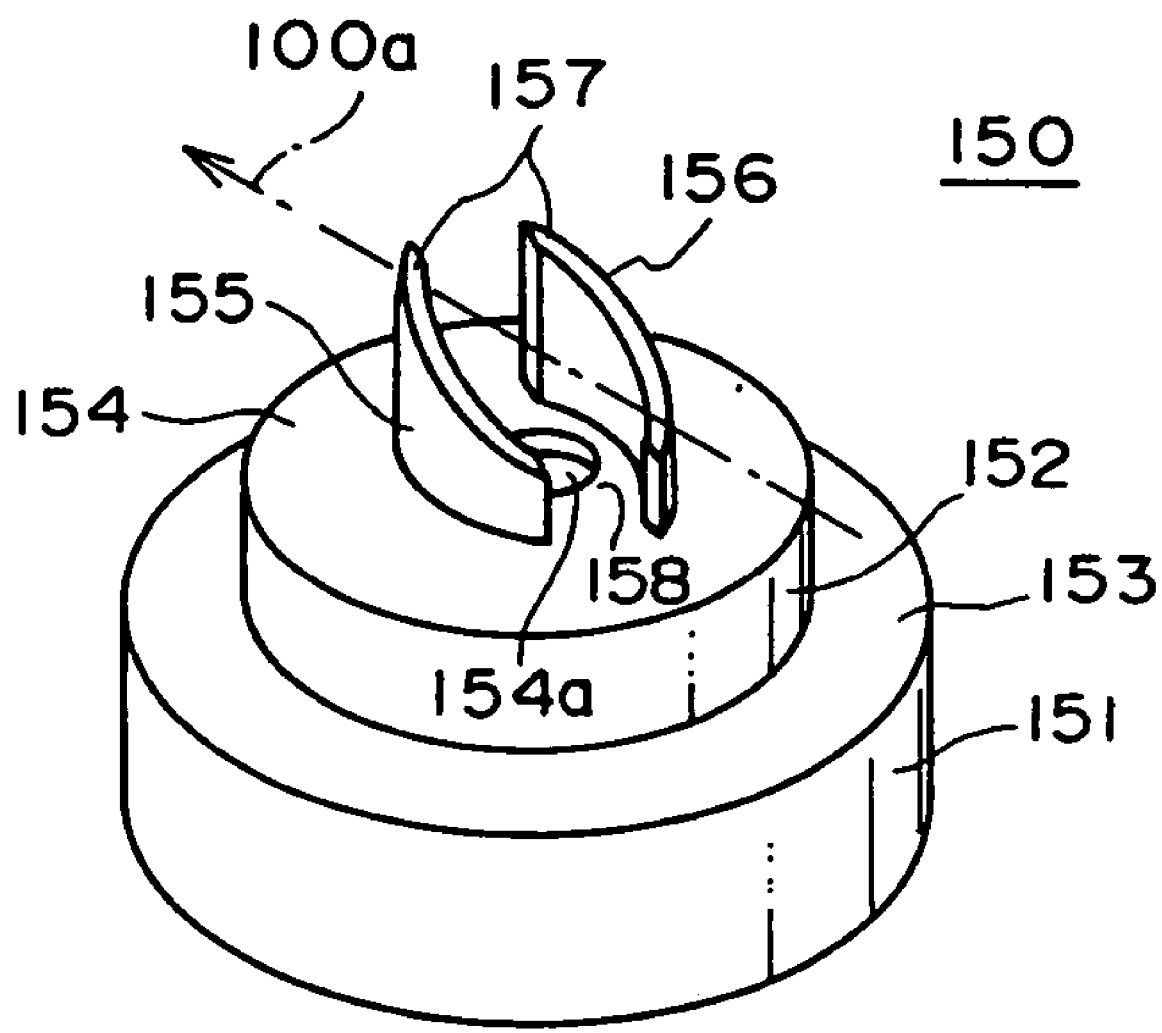
FIG. 7 is a perspective detailed view of the structure of the filter support member.

FIG. 7 is a perspective view showing the structure of the filter support member 150 in more detail.

As shown in FIG. 7, the filter support member 150 comprises a first cylindrical portion 151, a second cylindrical portion 152 having a smaller diameter than that of the first cylindrical portion 151, a stop portion 153 that connects the first and second cylindrical portions 151 and 152, a filter mounting portion 154 with an opening 154a provided at one end of the second cylindrical portion 152, and first and second projecting portions 155 and 156 provided on the filter mounting portion 154.

The first cylindrical portion 151, second cylindrical portion 152, stop portion 153 and filter mounting portion 154 comprise a cap portion. During actual use, as shown in FIG. 1, the cap portion of the filter support member 150 is set into the main housing 110, and the light-receiving component 140 is set into the cap portion. Therefore, when the light-receiving component 140 and filter support member 150 are held by the main housing 110, the first cylindrical portion 151 is set between the main housing 110 and the light-receiving component 140. The stop portion 153 acts as a stop to the inserted light-receiving component 140, so that the light-receiving component 140 is accurately positioned with respect to the filter support member 150.

As shown in FIG. 7, the first and second projecting portions 155 and 156 are curved parts formed by cutting a section of a cylinder, and are arranged on either side of the path of the transmitting light 100a. This enables the transmitting light 100a from the light-emitting component 130 to be supplied to the optical fiber 121 without being blocked by the filter support member 150.

The first and second projecting portions 155 and 156 each has a surface (first surface) 157 that is at an angle of 45 degrees to the path of the transmitting light 100a. The first optical filter 161 is maintained on this first surface 157. Thus, the first optical filter 161 is maintained at an angle of 45 degrees to the path of the transmitting light 100a. The filter mounting portion 154 also has a surface (second surface) 158 that is substantially perpendicular to the light-receiving component 140, and on which the second optical filter 162 is maintained.

The first optical filter 161 reflects the receiving light 100b from the optical fiber 121 and transmits the transmitting light 100a from the light-emitting component 130. The second optical filter 162 transmits the receiving light 100b from the optical fiber 121 and reflects the transmitting light 100a from the light-emitting component 130. Therefore, while the transmitting light 100a produced by the light-emitting component 130 is transmitted by the first optical filter 161 to the optical fiber 121, the receiving light 100b from the optical fiber 121 is reflected by the first optical filter 161, changing the path 90 degrees, after which the light falls substantially perpendicularly incident on the second optical filter 162 and is thereby transmitted to the light-receiving component 140.

In the optical module 100 of this embodiment having the above-described configuration, since a part of the surface of the main housing 110 has the irregular pattern 111 to increase the heat-dissipating property, heat generated by the light-emitting component 130 can be effectively exhausted without increasing the number of parts. Also, an additive is used to improve the thermal conductivity of the resin that is the main component of the sealant 135, ensuring that the heat generated by the light-emitting component 130 is efficiently conducted to the main housing 110. Thus, since in the optical module 100 of this embodiment the temperature elevation of the light-emitting component 130 is effectively avoided, the drive current to the light-emitting component 130 can be decreased, increasing the product reliability.

Moreover, because in the case of this optical module 100 the two optical filters 161 and 162 are held by just the one filter support member 150, it is possible to keep down the number of parts. Having the two optical filters 161 and 162 held by the one filter support member 150 also provides good positioning accuracy, since there is almost no deviation in the positional relationship of the two filters.

Figure 8:
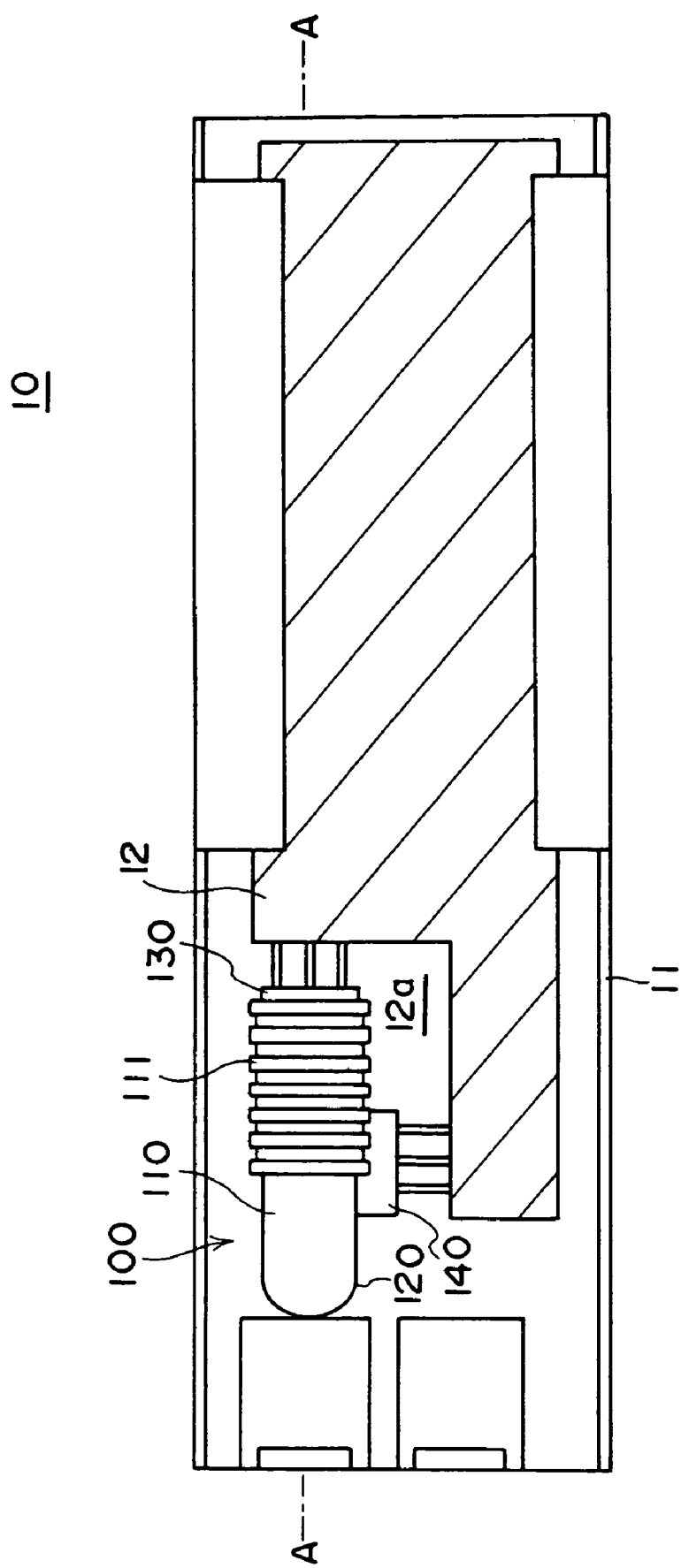
FIG. 8 is a plan view of an optical transceiver that is a preferred embodiment of the present invention.
Figure 9:
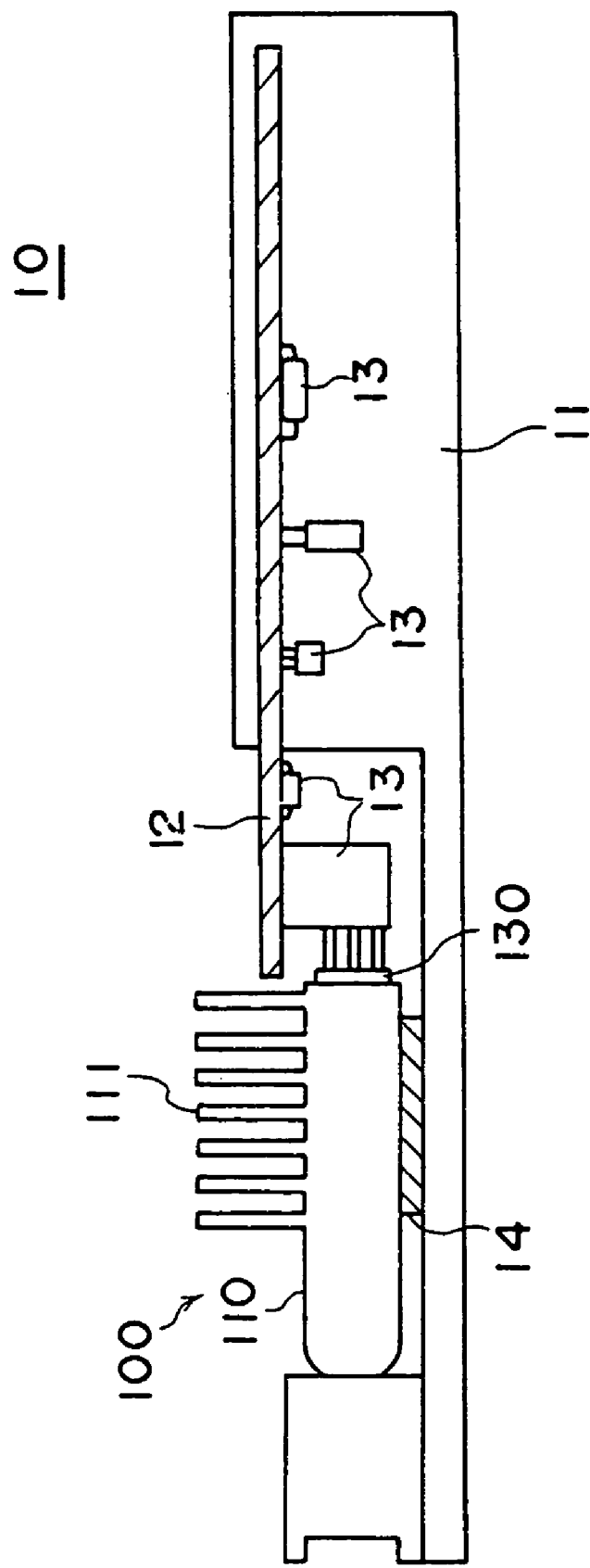
FIG. 9 is a cross-sectional view along line A-A of FIG. 8.

FIG. 8 is a plan view of an optical transceiver 10 that is a preferred embodiment of the present invention. FIG. 9 is a cross-sectional view along line A—A of FIG. 8.

As shown in FIGS. 8 and 9, the optical transceiver 10 of this embodiment comprises a transceiver case 11, a printed circuit board 12, and optical module 100 supported by the transceiver case 11. Formed on the printed circuit board 12 is an electronic circuit composed of a plurality of electronic components 13 and the like. Electric signals supplied by the optical module 100 and electric signals to be supplied to the optical module 100 are processed by this electronic circuit.

As shown in FIG. 8, a cut portion 12a is formed on the printed circuit board 12 corresponding to the optical module 100. This ensures that the irregular pattern 111 are exposed rather than being covered by the circuit board 12, so heat dissipation by the irregular pattern 111 is not obstructed by the circuit board 12. Note that it is not necessary to expose entire of the optical module 100 via the cut portion 12a. The cut portion 12a of the printed circuit board 12 should be formed corresponding to at least the irregular pattern 111.

As shown in FIG. 9, silicone gel 14 is provided between the main housing 110 and the transceiver case 11. This ensures that the heat of the main housing 110 is efficiently conducted to the transceiver case 11, thereby further enhancing the heat dissipation property. Because the silicone gel 14 hardens at a relatively low temperature, so the electronic components 13 and the like are not damaged during thermal hardening. It is preferable to add a agent that increases the thermal conductivity of the silicone gel 14. The same agent can be used that is used to raise the thermal conductivity of the sealant 135.

As described in the above, the optical transceiver 10 according to this embodiment has a structure that enables the heat of the optical module 100 to be efficiently dissipated. Making it possible effectively keep the temperature elevation of the light-emitting component 130 in check.

Figure 10:
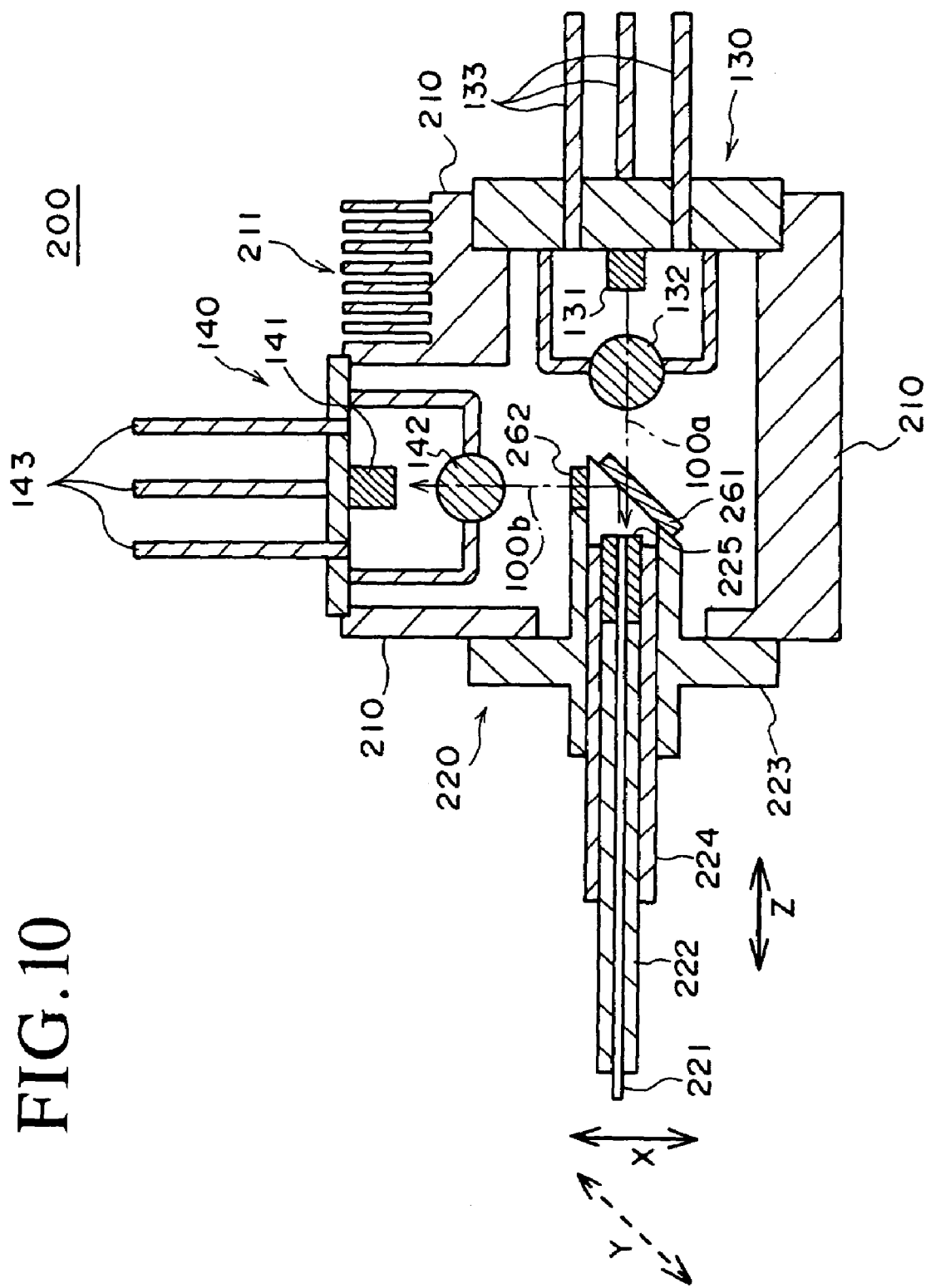
FIG. 10 is a cross-sectional view of the configuration of the optical module according to another preferred embodiment of the present invention.

FIG. 10 is a cross-sectional view of the configuration of an optical module 200 according to another preferred embodiment of the present invention.

As shown in FIG. 10, the optical module 200 according to this embodiment includes a main housing 210, a filter support component 220 affixed to the main housing 210, a light-emitting component 130, a light-receiving component 140, and first and second optical filters 261 and 262 that are held by the filter support component 220.

The main housing 210 is in the form of a cylindrical structure having the fiber support component 220 attached to one end and the light-emitting component 130 attached to the other end. The light-receiving component 140 is affixed at an angle of 90 degrees to a straight line connecting the fiber support component 220 and the light-emitting component 130. The light-emitting component 130 and the light-receiving component 140 have the same configuration used in the optical module 100 shown in FIG. 1.

In this embodiment, a part of the surface of the main housing 210 has an irregular pattern 211 to improve the heat dissipation property. Part of the main housing 210 therefore constitutes a heat sink. Heat generated by the light-emitting component 130 is therefore efficiently dissipated to the outside by the irregular pattern 211.

The filter support component 220 is attached in one end of the main housing 210. The filter support component 220 functions by holding not only the end of the optical fiber 221 as the optical signal transmission medium and the optical fiber cover 222, but also the first and second optical filters 261 and 262. The filter support component 220 includes a filter support member 223 that supports the first and second optical filters 261 and 262, and a cylindrical slider 224 into which is inserted a ferrule 225 that holds the end portion of the optical fiber 221. With respect to the main housing 210, the filter support member 223 can slidably move in the X direction (vertically with respect to FIG. 10) and the Y direction (normal to the page on which FIG. 10 is drawn), which allows the position of the optical fiber 221 to be adjusted perpendicularly to the optical axis. The cylindrical slider 224 can slidably move in the Z direction (from side to side with respect to FIG. 10) relative to the filter support member 223, which allows the position of the optical fiber 221 to be adjusted along the line of the optical axis. While there is no particular limitation on the material of the filter support member 223 and the cylindrical slider and 224, from the standpoint of mechanical strength and machining precision, it is preferable to use metal.

Figure 11:
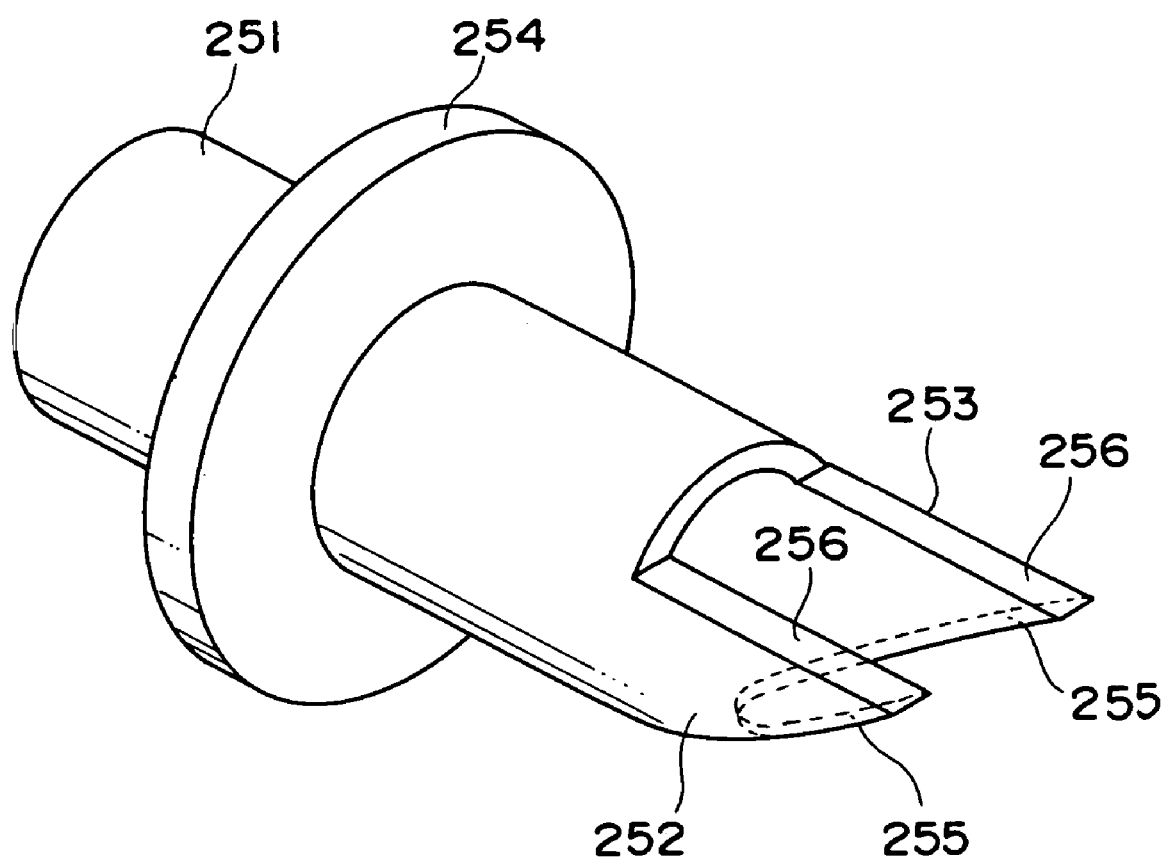
FIG. 11 is a perspective detailed view of the filter support portion of the filter support member shown in FIG. 10.

FIG. 11 is a perspective view showing the structure of the filter support member 223 included in the filter support component 220 in more detail.

As shown in FIG. 11, the filter support member 223 comprises a cylindrical portion 251, first and second projecting portions 252 and 253 provided on one end of the cylindrical portion 251, and a ring portion 254 provided on the peripheral of the cylindrical portion 251. The ring portion 254 functions as a stop for the filter support component 220 to the main housing 210.

As shown in FIG. 11, the first and second projecting portions 252 and 253 are curved parts formed by cutting a section of the end of the cylindrical portion 251 crossly and cutting another part the cylindrical portion 251. The first and second projecting portions 252 and 253 each has a surface (first surface) 255 that is at an angle of 45 degrees to the path of the transmitting light 100a. The first optical filter 261 is maintained on this first surface 255. Thus, the first optical filter 261 is maintained at an angle of 45 degrees to the path of the transmitting light 100a. The first and second projecting portions 252 and 253 also has a surface (second surface) 256 that is substantially perpendicular to the light-receiving component 140, and on which the second optical filter 262 is maintained.

As in the case of the first optical filter 161 used in the above embodiment, the first optical filter 261 reflects the receiving light 100b from the optical fiber 221 and transmits transmitting light 100a emitted by the light-emitting component 130. Similarly, as in the case of the second optical filter 162 used in the above embodiment, the second optical filter 262 transmits the receiving light 100b from the optical fiber 221 and reflects the transmitting light 100a from the light-emitting component 130. This makes it possible for the optical module 200 to function in the same way as the optical module 100.

The present invention is in no way limited to the aforementioned embodiments, but rather various modifications are possible within the scope of the invention as recited in the claims, and naturally these modifications are included within the scope of the invention.

What is claimed is:

1. An optical module to be employed to an optical transceiver, for converting an optical signal received from an optical fiber into an electronic signal and converting the electronic signal into the optical signal to be supplied to the optical fiber, comprising:
   a one-piece main housing to which the optical fiber can be attached, at least a portion of one or more surfaces of the main housing having a heat sink formed therein;
   a light-emitting component attached to the main housing; and
   a light receiving component attached to the main housing, wherein said optical fiber extends into a portion of space enclosed by the one-piece main housing.

2. The optical module as claimed in claim 1, wherein said heat sink has an irregular pattern and is formed in a vicinity of the light emitter component.

3. The optical module as claimed in claim 1, wherein said heat sink includes a plurality of fins or rods.

4. The optical module as claimed in claim 2, wherein said irregular pattern is constituted of a plurality of fins or rods.

5. The optical module as claimed in claim 1, further comprising a sealant to seal a gap between the main housing and the light-emitting component, a main component of the sealant being a resin including an agent to enhance a thermal conductivity.

6. The optical module as claimed in claim 2, further comprising a sealant to seal a gap between the main housing and the light-emitting component, a main component of the sealant being a resin including an agent to enhance a thermal conductivity.

7. Optical module as claimed in claim 3, further comprising a sealant to seal a gap between the main housing and the light-emitting component, a main component of the sealant being a resin including an agent to enhance a thermal conductivity.

8. The optical module as claimed in claim 5, wherein a thermal conductivity of the agent is equal to or more than 200 W/(m·° C.).

9. The optical module as claimed in claim 5, wherein the agent is in a form of particles having a diameter that is 0.1 to 20 µm.

10. The optical module as claimed in claim 8, wherein the agent is in a form of particles having a diameter that is 0.1 to 20 µm.

11. The optical module as claimed in claim 5, wherein the agent includes at least one of materials selected from a group of copper (Cu), silver (Ag), aluminum (Al), aluminum nitride (AlN), beryllium oxide (BeO), silicon carbide (SiC), diamond and diamond-like carbon.

12. The optical module as claimed in claim 8, wherein the agent includes at least one of materials selected from a group of copper (Cu), silver (Ag), aluminum (Al), aluminum nitride (AlN), beryllium oxide (BeO), silicon carbide (SiC), diamond and diamond-like carbon.

13. The optical module as claimed in claim 1, further comprising:
   a filter support member having a first surface which has a first angle to an optical path of a light from the light-emitting component and a second surface which has a second angle different from the first angle;
   a first optical filter mounted on the first surface of the filter support member; and
   a second optical filter mounted on the second surface of the filter support member.

14. The optical module as claimed in claim 13, wherein said first optical filter can reflect a light supplied from the optical fiber and can transmit a light emitted from the light-emitting component, and the second optical filter can transmit a light supplied from the optical fiber and can reflect a light emitted from said light-emitting component.

15. An optical transceiver comprising an electronic circuit formed on a circuit board and an optical module for converting an optical signal received from an optical fiber into an electronic signal to be supplied to the electronic circuit and converting the electronic signal received from the electronic circuit into the optical signal to be supplied to the optical fiber, the optical module, comprising:
a single-piece main housing to which the optical fiber can be attached;
a light-emitting component attached to the main housing; and
a light-receiving component attached to the main housing,
at least a portion of one or more walls of the main housing having an irregular pattern to enhance a thermal dissipation.

16. The optical transceiver as claimed in claim 15, wherein said circuit board has a cut portion to prevent the circuit board from covering the irregular pattern of the main housing, and the optical fiber extends into at least a portion of space enclosed by said single-piece main housing.

17. The optical transceiver as claimed in claim 15, further comprising a transceiver case for supporting the circuit board and the optical module and a silicone gel provided between the transceiver case and the main housing.

18. The optical transceiver as claimed in claim 16, further comprising a transceiver case for supporting the circuit board and the optical module and a silicone gel provided between the transceiver case and the main housing.

19. The optical transceiver as claimed in claim 17, wherein said silicone gel includes an agent to enhance a thermal conductivity.

20. The optical transceiver as claimed in claim 18, wherein said silicone gel includes an agent to enhance a thermal conductivity.

21. An optical module, comprising:
a heat sink formed integral with and as a portion of a one-piece main housing wall structure so as to enhance a thermal dissipation, wherein the main housing wall structure is configured for receiving one or more optical fiber and the main housing wall structure is configured to house a light-receiving component and a light-emitting component.

22. The optical module as claimed in claim 21, wherein the heat sink and the main housing are formed as a single integral part and the one or more optical fiber extends into a space enclosed by the main housing.

23. The optical module as claimed in claim 21, wherein the heat sink is formed as an irregular pattern formed adjacent to at least a light-emitting component coupled within the main housing.

24. The optical module as claimed in claim 21, further comprised of:
a light-emitting component couple to the main housing;
a light-receiving component coupled to the main housing;
a filter support member having a first surface which has a first angle to an optical path of a light from the light-emitting component and a second surface which has a second surface different from the first angle;
a first optical filter mounted on the first surface of the filter support member; and
a second optical filter mounted on the second surface of the filter support member.

* * * * *

UNITED STATES PATENT AND TRADEMARK OFFICE
CERTIFICATE OF CORRECTION

PATENT NO. : 7,048,451 B2
APPLICATION NO. : 10/885032
DATED : May 23, 2006
INVENTOR(S) : Lo et al.

Page 1 of 1

It is certified that error appears in the above-identified patent and that said Letters Patent is hereby corrected as shown below:

On title page on Item (75) Line 1-2 Delete Makoto Sekijma and insert Makoto Sekijima Signed and Sealed this First Day of August, 2006

JON W. DUDAS
*Director of the United States Patent and Trademark Office*